United States Patent [19]

Canto

[11] 4,344,593
[45] Aug. 17, 1982

[54] SUPPORT FOR HORIZONTAL PIPE OR THE LIKE

[76] Inventor: Gabriel F. Canto, 11409 Bombardier Ave., Norwalk, Calif. 90650

[21] Appl. No.: 186,968

[22] Filed: Sep. 15, 1980

[51] Int. Cl.³ .............................................. F16L 3/08
[52] U.S. Cl. .................................. 248/73; 248/74 R; 248/222.2
[58] Field of Search ................. 248/73, 74 R, 65, 235, 248/220.1, 220.2, 222.2, 316 B, 224.4; 211/193

[56] References Cited

U.S. PATENT DOCUMENTS

| | | | |
|---|---|---|---|
| 1,050,235 | 1/1913 | Scanlan | 248/74 R |
| 1,375,617 | 4/1921 | Tonguett | 248/222.2 X |
| 1,703,872 | 3/1929 | Engelson | 248/224.4 X |
| 2,273,668 | 2/1942 | Steiner | 248/224.4 |
| 4,013,253 | 3/1977 | Perrault et al. | 248/248 X |
| 4,039,131 | 8/1977 | Perrault et al. | 248/222.2 X |

FOREIGN PATENT DOCUMENTS 2233077  1/1974  Fed. Rep. of Germany .

Primary Examiner—Ramon S. Britts
Assistant Examiner—Ramon O. Ramirez
Attorney, Agent, or Firm—Harvey S. Hertz

[57] ABSTRACT

A cantilevered pipe support for mounting on a vertical support member to support a horizontal pipe run. An elongated strut having a stamped indentation well within the perimeter of said strut provides bending rigidity. The strut is mounted on edge (vertically) in its width dimension and is elongated horizontally to a cantilevered end opposite the end thereof supported on the vertical support member. A "nose" at the upper, outer strut extremity supports a right angle bracket through a notch in the vertical leg of the bracket and a "chin" projection extends from the lower outer strut extremity, the nose having an inward notch into which the first bracket leg locks at the top of the first notch. An upward projection at the outer extremity of the "chin" projection extends through a second slot in the second bracket leg, forming a second notch into which the second leg of the bracket rests. The second leg includes means for anchoring a horizontal pipe run generally perpendicular to the strut.

9 Claims, 2 Drawing Figures

SUPPORT FOR HORIZONTAL PIPE OR THE LIKE

BACKGROUND OF THE INVENTION (1) Field of the Invention

The invention relates to apparatus for support of horizontal pipe runs, or the like.

(2) Description of the Prior Art

In the prior art many support devices have been devised which address the same problem as that to which the present invention applies, namely the support of horizontal pipe runs.

Some typical prior art depicted in the patent literature includes U.S. Pat. Nos. 1,824,459 and 1,050,235. Both of the prior devices described are relatively expensive to manufacture and require time consuming installation on the job. Accordingly, there has emerged an important need for a pipe support apparatus which is easily and quickly assembled on the job, and which is inexpensive in manufacture. The manner in which the invention deals with the shortcomings of the prior art to provide a novel and highly advantageous structure for the purpose will be understood as this description proceeds.

SUMMARY OF THE INVENTION

It may be said to have been the general object of the invention to provide a support structure (hanger) which is inexpensive to manufacture and is quickly, easily and effectively assembled on the job where horizontal runs of pipe or the like are to be installed.

The assembly of the invention includes an approximately planar stamped strut member formed at one end to the semi-circular (or similar) shape of a support pipe or column. As installed to the vertical structure, the strut has its width dimension in a vertical plane and is elongated perpendicularly outward to a cantilevered end. There a notched "nose" on the strut extremity engages a slot in a vertical leg of a general right angle bracket, the thickness of the vertical leg falling into a notch at the base of the "nose" adjacent to the strut cantilevered extremity. A "chin" projection supports the second orthogonally oriented leg of the bracket and an upward projection on the "chin" projection engages a second slot in the bracket second leg, thereby providing a gravity-lock of the bracket to the strut. The entire assembly is composed of parts individually manufactured using economical sheet metal forming (stamping and the like) processes, and on-the-job assembly is easily and quickly carried out.

DESCRIPTION OF THE PREFERRED EMBODIMENTS

Figure 1:
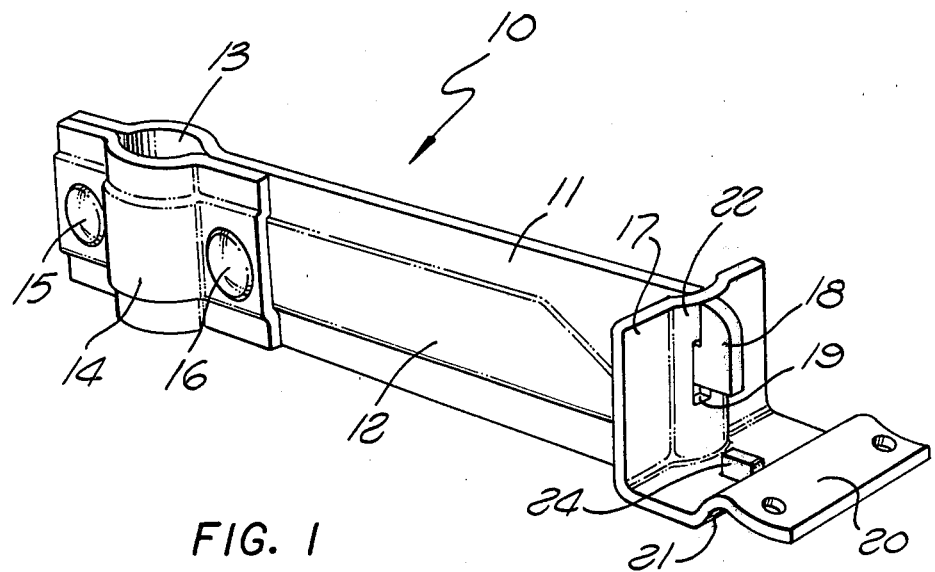
FIG. 1 is an assembled pictorial view of the pipe support apparatus according to the invention.

Referring now to FIG. 1, the pipe support of the invention will be seen generally at 10 as it would normally be assembled. A strut 11 of arbitrary length spaces the pipe to be supported away from a generally vertical anchoring structure (pipe or tube) by the arbitrary amount, and acts as a cantilever beam. The strut 11 is formed into a semi-circular section 13 as illustrated, and a short matching clamp part 14 which is similarly formed is bolted at 15 and 16 to the strut 11. The aforementioned vertical anchoring structure is gripped between 13 and 14, the strut 11 thereby extending horizontally and substantially perpendicular to that anchoring structure.

Figure 2:
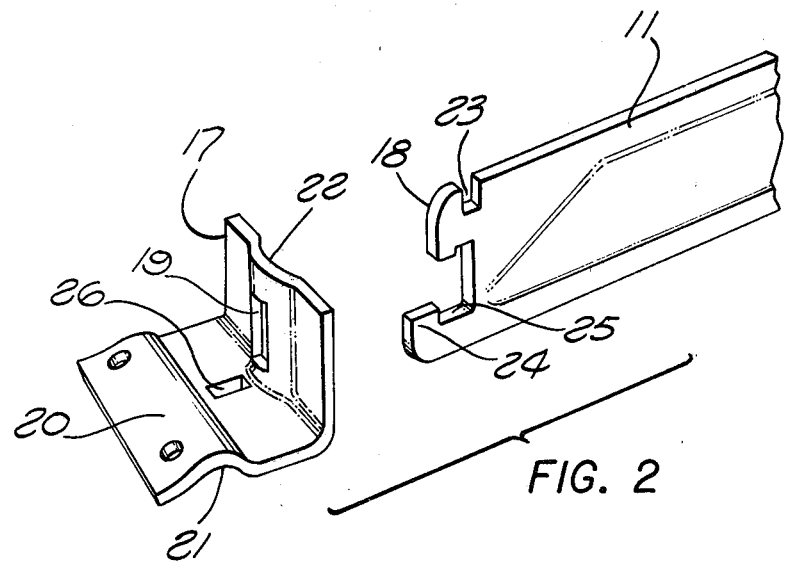
FIG. 2 is an exploded pictorial view of the support of FIG. 1, in which strut and bracket members have been separated for clarity.

A bracket 17, preferably formed as a generally right-angle bracket having first and second legs is uniquely mounted to the cantilevered (face) end of strut 11, and for a clear understanding of this mounting the description continues referring to FIG. 2. From FIG. 2, it will be seen that strut 11 has a nose-like formation 18 at its free end and a chin-like projection 24 at its free end substantially at the bottom extremity of strut 11 as it is intended to be mounted in use. The angle bracket 17 is shown in FIG. 2 in the geometric orientation required for mating with 11 to form the completed assembly of FIG. 1, it being only necessary to place the bracket 17 over the "nose" and "chin" projections, 18 and 24 respectively to complete the assembly on the job.

Angle bracket 17 will be seen to be formed with an arcuate bend 22 in the vertical plane (first bracket leg), this facilitating its mating to strut 11. It will also be noted that bracket 17 includes a vertical slot 19 and a horizontal slot 26 (in the second bracket leg), both of which would be bisected by the vertical plane containing the strut 11. Slot 19 has a vertical dimension somewhat greater than the vertical dimension of nose 18 to facilitate assembly, and as assembled the notch 23 contains the thickness of the metal of bracket 17 as it drops downward during installation. Thus the top of nose 18 is approximately flush with the top of strut 11. The "chin" 24 includes a notch 25 somewhat greater in the longitudinal dimension of the strut 11 for ease of assembly, although geometrically that slot dimension need only have the same width as the metal of bracket 17 plus a suitable tolerance. The vertically extending extremity of chin 24 engages the slot 26 as the bracket 17 is forced downward over nose 18.

It will be realized that the parts of the assembly of the pipe support are all readily manufactured by blanking and stamping processes well known in manufacturing. The stamped offset panel (indentation) 12 shown in strut 11 in FIG. 1 provides a degree of bending rigidity. The arcuate formation (dimple) 22 will be recognized as desirable but not absolutely necessary to the invention. The vertical portion of bracket 17 could be planar although dimple 22 is considered mechanically desirable.

The horizontally extending portion 20 of bracket 17 includes a substantially planar portion in which slot 26 is placed, and an outer portion shaped to fit against a pipe or tube suspended therefrom and clamped to 20 by conventional means including bolt holes provided in 20. The pipe or tube to be supported runs generally perpendicular to strut 11 and also in a line perpendicular to the support pipe or other structure gripped by 13 and 14 (FIG. 1).

The pipe support of the invention can obviously supprt rods, bars or other members in lieu of its use for a pipe support. Similarly the support structure to which 13 and 14 clamp need not be of circular cross-section, although in installations in which the invention is most useful, such a support structure would be a vertically extending pipe column.

It will be realized from this description that the bracket 17 could be modified to include horizontal sections for supporting a plurality of pipes running generally parallel and one above the other.

Base materials and surface treatments for the parts of the pipe support according to the invention may be those which are conventional and well known in the art.

It will also be recognized that, in lieu of clamp part 14, another strut part 11 could be employed clamped against 11 and extending oppositely from the vertical support. In that case, the additional strut would have the same semi-circularly formed portion 13, which would provide support structure clamping in lieu of part 14. Two generally parallel horizontal pipes would thereby be supported, one on either side of said vertical support.

The apparatus according to the invention will be seen to provide a gravity locked support structure which saves installation time on the job as compared to prior art pipe supports.

Various additional minor modifications within the general configuration of the invention will suggest themselves to those of skill in this art, once the invention is understood. Accordingly, it is not intended that the drawings or this description should be regarded as limiting the scope of the invention. The drawings and description are intended to be illustrative and typical.

I claim:

1. A support device for horizontal runs of pipe or the like, comprising;
    generally flat stip having its width dimension in a vertical plane, said stip being elongated to form a generally horizontal strut having a support end and a cantilevered end;
    first means for attaching said strut to a generally vertical support at said support end;
    second means comprising a nose projecting longitudinally outward from said strut cantilevered end, said nose being adjacent the top of said strut cantilevered end, said strut further including a notch in the top edge of said strut adjacent to the attachment of said nose to said strut;
    third means comprising a bracket having first and second generally perpendicular legs, said first leg being generally vertical and including a generally vertical first slot, said first slot accepting said strut nose, said bracket seating downward into said notch; and
    fourth means comprising means within said bracket second leg for mounting at least one elongated horizontal member to be supported, said horizontal member being a pipe or the like.

2. Apparatus according to claim 1 in which said strut includes a stamped lateral indentation within a central area of the surface of said strut thereby to provide said strut with bending stiffness.

3. Apparatus according to claim 1 in which fifth means are included comprising a chin projecting from and adjacent the bottom edge of said cantilevered end of said strut, said chin projection and said bracket being so dimensioned that said bracket second leg seats on said chin projection when said strut nose is fully seated in said bracket first slot.

4. Apparatus according to claim 3 in which said chin projection has an upwardly projecting tip adjacent its outward end and said bracket comprises a second slot located in its second leg to permit said upwardly projecting tip to project through said second slot when said bracket second leg is seated on said chin projection.

5. Apparatus according to claim 4 in which said first leg of said bracket has a dimpled portion in the shape of a segment of a cylindrical surface, said dimple extending vertically and being concave toward said cantilevered end of said strut, said first slot having its width substantially centered laterally within said dimpled portion of said bracket first leg.

6. Apparatus according to claim 3 in which said strut includes a stamped lateral indentation within a central area of the surface of said strut thereby to provide said strut with bending stiffness.

7. Apparatus according to claim 4 in which said strut includes a stamped lateral indentation within a central area of the surface of said strut thereby to provide said strut with bending stiffness.

8. Apparatus according to claim 5 in which said strut includes a stamped lateral indentation within a central area of the surface of said strut thereby to provide said strut with bending stiffness.

9. A support device for horizontal runs of pipe or the like, comprising:
    a generally flat strip having its width dimension in a vertical plane, said strip being elongated to form a generally horizontal strut having a support end and a cantilevered end;
    first means for attaching said strut to a generally vertical support at said support end;
    second means comprising a nose projecting longitudinally outward from the top of said strut cantilevered end, said strut having a notch in its top edge adjacent said nose;
    third means comprising a bracket having first and second mutually generally perpendicular legs, said first leg being generally vertical and including a generally vertical slot for accepting said strut nose, said bracket seating downward into said notch as said nose projects into said vertical slot;
    fourth means within said bracket second leg for attaching at least one elongated horizontal member to be supported;
    fifth means comprising a chin projecting from and adjacent the bottom edge of said strut cantilevered end, said chin projection and said bracket being so dimensioned that said bracket second leg seats on said chin when said strut nose is fully engaged in said bracket first slot; and
    a second slot in said bracket second leg and an upwardly projecting tip on the outer end of said chin, said tip projecting into said second slot.

* * * * *